Dec. 25, 1956 C. L. ISBORN 2,775,713
FERRO-RESONANT FLIP-FLOP CIRCUIT
Filed March 22, 1954 3 Sheets-Sheet 1
Fig. 1
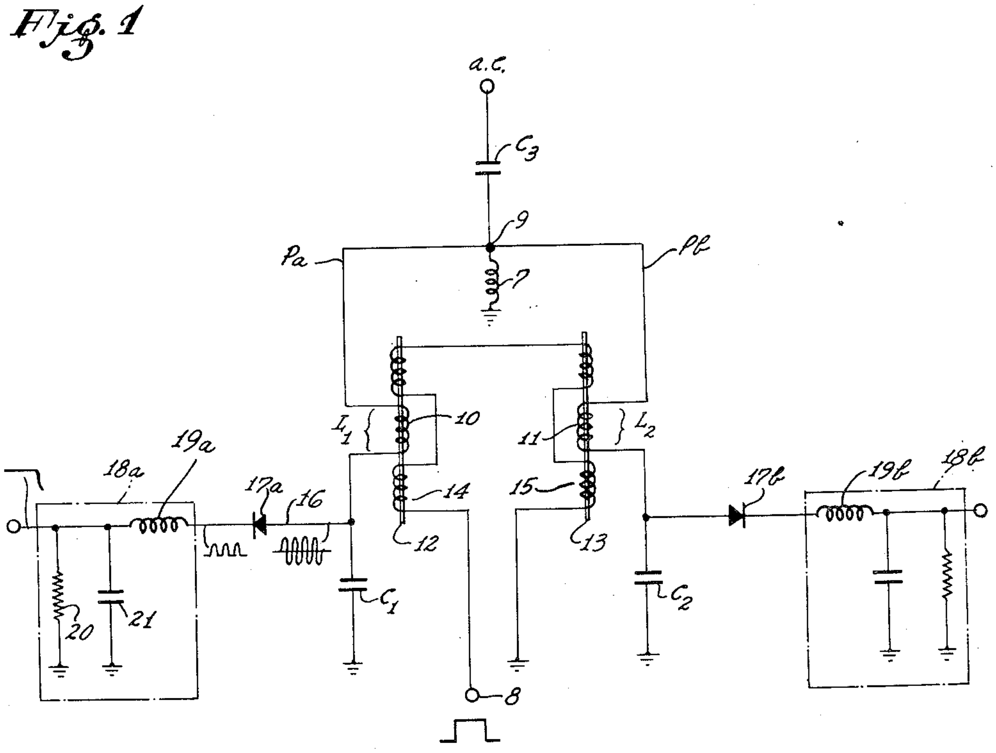
Fig. 2
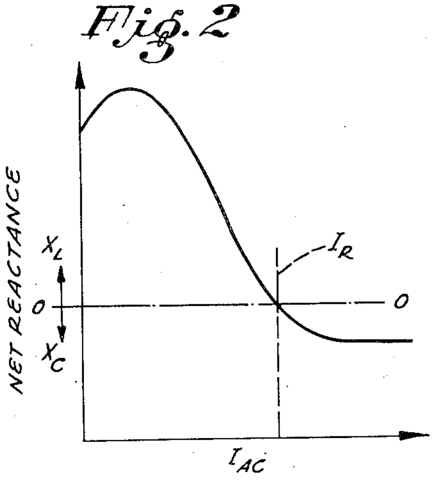
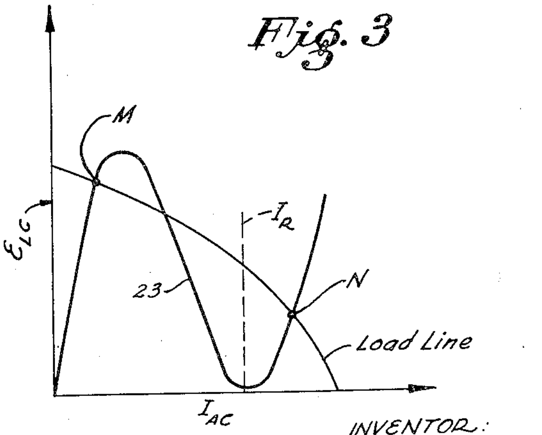
INVENTOR:
Carl L. Isborn
By Earl Bennett
Louis A Kline
John J. Matlago, Agent
His Attorneys Dec. 25, 1956 C. L. ISBORN 2,775,713

FERRO-RESONANT FLIP-FLOP CIRCUIT

Filed March 22, 1954 3 Sheets-Sheet 2

INVENTOR:
Carl L. Isborn
By Pearl Benst
Louis A Kline
John J. Matlago, Agent
His Attorneys Dec. 25, 1956 C. L. ISBORN 2,775,713

FERRO-RESONANT FLIP-FLOP CIRCUIT

Filed March 22, 1954 3 Sheets-Sheet 3

INVENTOR:
Carl L. Isborn
Carl Benst
By Louis A Kline
John J. Matlago, Agent
His Attorneys

United States Patent Office 2,775,713

Patented Dec. 25, 1956

2,775,713

FERRO-RESONANT FLIP-FLOP CIRCUIT

Carl L. Isborn, Hawthorne, Calif., assignor to The National Cash Register Company, a corporation of Maryland Application March 22, 1954, Serial No. 417,625

13 Claims. (Cl. 307—88)

This invention relates to circuits having two states of equilibrium and more particularly to a novel ferro-resonant flip-flop circuit.

The flip-flop circuit herein described comprises two ferro-resonant paths which are connected in parallel to an A. C. source such that only one of the paths can be in a highly conducting state at a time. This arrangement of a flip-flop circuit has been disclosed in a co-pending Isborn application, Serial No. 175,784, filed July 25, 1950. The present flip-flop circuit represents an improvement mainly in the manner by which the circuit can be triggered from one stable conducting state to the other in response to pulses applied on a single input to the circuit.

In a single input flip-flop circuit, a memory effect is needed to ensure that successive pulses applied on the input will trigger the flip-flop to its opposite stable operating state. In the case of the well-known flip-flop arrangement utilizing a pair of vacuum tubes, for example, a trigger pulse applied to the single input momentarily cuts off conduction in both tubes and the built-in memory effect ensures that the opposite tube becomes conducting upon the termination of the pulse. This memory effect in the vacuum tube flip-flop is provided by the energy stored in the RC circuits which cross-couple the anode of each tube to the grid of the other tube.

The present circuit utilizes an inductive type load element connected in the output circuits of each of the ferro-resonant paths to perform this memory function. This operation is such that a trigger pulse applied to the single input causes the particular path that is in a low conductive state, for example, to start drawing a greater amount of current. The paths are so interconnected through a common impedance to the A. C. source that an increase of current in one path causes a decrease of current in the other. Thus during application of the trigger pulse, neither path is in resonance. Upon termination of the trigger pulse, the voltage rises across the paths forcing one of them into resonance; and because of the large inductive kickback generated by the inductor in the output circuit of the path which was previously in a high conducting state, the opposite path is favored to become resonant.

It is, accordingly, an object of this invention to provide a single input bistable state circuit comprised of a pair of ferro-resonant paths which utilize inductive memories therein to ensure proper switching of the high conducting condition from one path to the other upon application of successive pulses to the single trigger input of the circuit.

Another object of this invention is to provide a novel single input ferro-resonant bistable state circuit arrangement in which circuit loading does not affect the operational reliability thereof.

A further object of this invention is to provide a highly reliable single input ferro-resonant flip-flop circuit whose operation is not critically dependent upon trigger pulse width.

Another object of this invention is to provide a single input ferro-resonant bistable state circuit in which the inductive memories therein also serve as the control windings of magnetic amplifiers provided in the outputs of the circuit.

These and other objects of this invention as well as additional features thereof will become more apparent by reference to the ensuing description and the accompanying drawings in which:

Fig. 1 is a schematic diagram of a single input ferro-resonant flip-flop circuit in which the inductive type memories are utilized.

Figs. 2 and 3 are graphs explaining the theory of operation of each of the ferro-resonant paths comprising the flip-flop circuit.

Figure 4:
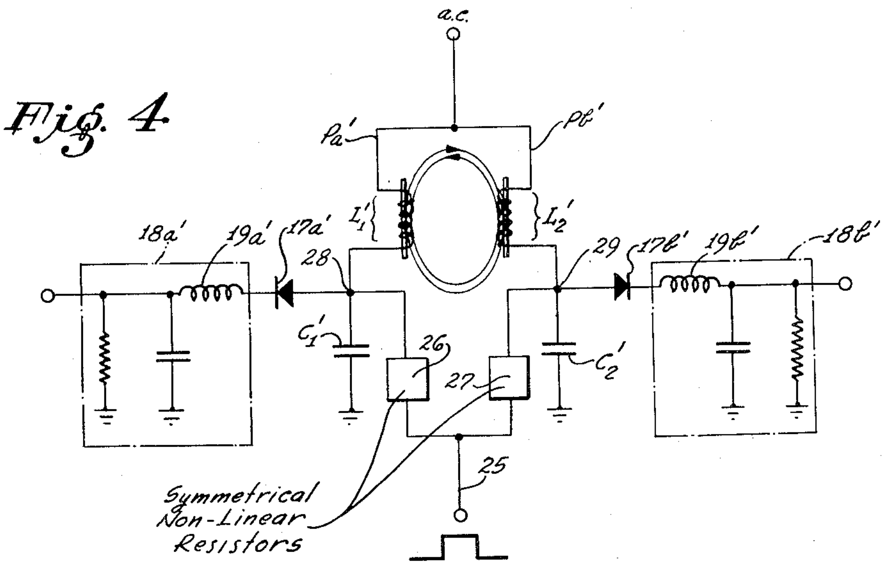
Fig. 4 is a schematic diagram of an alternate embodiment of the invention showing how the circuit can be triggered without the use of trigger windings on the saturable core inductors thereof.

Referring to Fig. 1, a schematic diagram of a single input ferro-resonant flip-flop circuit is presented which embodies the improvement of the present invention. This flip-flop circuit comprises a pair of paths P*a* and P*b* connected in parallel. Path P*a* includes an inductor $L_1$ in series with capacitor $C_1$; and path P*b* includes an inductor $L_2$ in series with a capacitor $C_2$. The corresponding elements in each of these paths have the same values. The inductor ends of paths P*a* and P*b* are joined at junction 9 and connected through a common load capacitor $C_3$ to a low impedance A. C. supply. The R. F. choke 7 provides a D. C. return to ground. The inductors $L_1$ and $L_2$ are comprised of coils 10 and 11 having cores 12 and 13, respectively. These cores are preferably formed by rolling a thin sheet of material having ferromagnetic properties to obtain a tube having a length to diameter ratio on the order of 10 to 1.

In the embodiment of Fig. 1, an input trigger coil 14 is wound about the core 12 of inductor $L_1$ and a similar input trigger coil 15 is wound about the core 13 of inductor $L_2$. The trigger coils 14 and 15 are connected in series such that a trigger pulse applied to terminal 8 of coil 14 energizes both trigger coils simultaneously.

Each of the LC paths so far described has an inherent bistable operation according to the principle of ferro-resonance. The bistability of path P*a*, for example, as connected between junction 9 and ground, can be explained by referring to Figs. 2 and 3. The iron core 12 of inductor $L_1$ causes the reactance $X_L$ of the inductor $L_1$ to vary as a function of current therethrough. The reactance $X_C$ of capacitor $C_1$, on the other hand, is fixed and its value is so chosen with relation to that of the inductor $L_1$ that on initial application of a relatively small applied alternating voltage across the path P*a*, the effective current therein is small and the net reactance is inductive as shown in Fig. 2. Upon increasing the applied alternating voltage, since the inductor $L_1$ has an iron core, the inductive reactance decreases with the increased current until the resonant point indicated at $I_R$ is reached. A further increase of current causes the iron core to suffer A. C. saturation which results in a still further reduction of the effective inductive reactance of inductor $L_1$. This variation of net reactance with current flow can be shown to be regenerative for a predetermined operating voltage applied across the LC path such that the current can be made to jump between a stable point where the inductive reactance is predominant and a stable point characterized by the capacitive reactance being slightly greater than the inductive reactance.

The jumping characteristic of this circuit for a proper applied voltage is further explained by its voltage-current characteristic curve, as shown in Fig. 3. As the alternating current is increased, the voltage $E_{LC}$ across the LC path will first rise, reach a maximum, then decrease to a minimum at a current value $I_R$. After $I_R$ is exceeded, the voltage $E_{LC}$ rises in a normal fashion. It should be noted that the negative slope 23 represents a negative reactance region which results in an unstable operation. Thus, if the proper operating voltage is chosen and the internal resistance of the circuit is small enough, the LC path can be operated so that it will exhibit two possible stable values of $I_{AC}$, as shown by the load line in the graph of Fig. 3. Operating point M on the graph is characterized by low current and high inductive reactance, while operating point N is characterized by a high current and a slightly capacitive reactance.

In the flip-flop circuit arrangement of Fig. 1, the reactance of the common impedance $C_3$ is so chosen that one, and only one, of the LC paths can be in resonance at a time. If both should try to go into resonance the voltage at junction 9 would fall so low due to the voltage drop across $C_3$ that neither path P*a* nor P*b* will have a sufficient voltage across it to maintain resonance. On the other hand, if paths P*a* and P*b* should both try to go out of resonance, the voltage at junction 9 would rise to such a value that one path or the other should be forced to break down and go into resonance.

Referring again to Fig. 1, note that the flip-flop circuit status is sensed by means of the magnitude of A. C. voltage appearing on the output leads connected to each of the paths, such as output lead 16, for example. This A. C. voltage is rectified by means of rectifier **17*a* and the resulting pulsating D. C. voltage is smoothed by a filter circuit 18*a* comprising a series inductor 19*a* connected to resistor 20 and capacitor 21 shunting the output lead to ground. It is the D. C. current generated in inductor 19*a*** on the output of path P*a*, or inductor **19*b*** on the output of path P*b*, which serves as an aid in switching the flipflop to its alternate stable state on application of successive pulses on the single input. The output inductor **19*a* or 19*b*** which is connected to the highly conductive path provides an inductive kickback when the current status of the flip-flop is interrupted by the trigger pulse. This inductive kickback persists after the trigger pulse is terminated, and effectively damps or loads the path which was previously in a high conducting status, thus favoring the other path to go into resonance.

The manner in which output inductors **19*a* and 19*b*** serve as a reliable memory for aiding the triggering of the ferro-resonant flip-flop circuit will now be further considered. For purposes of explanation, assume the flip-flop circuit of Fig. 1 is highly conducting through path P*a* including inductor $L_1$ therein. Thus inductor **19*a*** connected to the output of path P*a* is initially drawing high current while output inductor **19*b*** connected to the output of path P*b* is drawing low current. The effect of a trigger pulse applied to the trigger coils 14 and 15 via input terminal 8 is to saturate inductor $L_2$, thus tending to drive path P*b* toward a high current condition which results in a drop in voltage at junction 9. This causes the current in path P*a* to start to decrease. At the termination of the trigger pulse the voltage at junction 9 again increases due to the fact that neither path P*a* nor P*b* is in true resonance at this instance. This rise in voltage forces either path P*a* or path P*b* to go into resonance. Now, since path P*a* and inductor **19*b*** were initially passing a high current while path P*b* and consequently inductor **19*b* were passing a low current, the latter path offers the least impedance to the higher voltage at junction 9** created by the termination of the trigger pulse, and thus path P*b* is favored to go into resonance over path P*a*.

It should be noted that a single input ferro-resonant bistable state circuit tends to exhibit an inherent memory effect resulting from the regenerative nature of the transient circuit conditions therein, i. e., inasmuch as one ferro-resonant path was decreasing in current at the instant a trigger pulse terminated and the other ferro-resonant element was simultaneously increasing in current. It can be shown that, once initiated, this trend has a tendency to continue and the increasing current ferro-resonant path goes into the relatively high conducting state while the decreasing current ferro-resonant path goes into the relatively low conducting state. Inasmuch as the time required to achieve a complete transition in a ferro-resonant flip-flop status is approximately five cycles of the applied power frequency, the inherent memory effect is thus seen to be critically dependent upon the width of the trigger pulse which should be about four cycles of the applied power frequency, for example. That is, the trigger pulse must terminate before the transient in operating condition caused thereby has been completed.

Thus it is to be noted that the inductive output loads described herein serve as a reliable memory because they make the single input ferro-resonant bistable state circuit less critical in operation; e. g., the circuit can be triggered by a pulse of practically any width less than the time constant of the inductors provided in the outputs of the paths.

It should be further noted that the filter capacitor 21 on the output line from the ferro-resonant path P*a* exhibits an effect which is adverse to proper switching of the stable states of the paths of the flip-flop circuit; i. e., the capacitor in the output circuit of the high conducting path of the ferro-resonant flip-flop circuit is charged while the capacitor in the output circuit of the low conducting path is discharged. Thus, when both conductive paths of the circuit are temporarily rendered nonresonant, as by an applied trigger pulse, for example, the path offering the least capacitive loading will be the first to get back into resonance or high conduction status after this trigger pulse has terminated. But the path with the least capacitive loading will be the path whose output capacitor is already charged, i. e., the same path that was in resonance before occurrence of the trigger pulse. Thus there is a tendency for large capacitive loads to hinder proper switching action; i. e., a filter capacitor in the output circuit of a ferro-resonant path tends to suppress the correct switching sequence of the circuit. Thus it should be understood that an inductive load is needed when using a filter circuit in the output of the flip-flop so as to ensure that the correct switching action is obtained.

Fig. 4 is a schematic diagram of a simplified modification of a ferro-resonant bistable state circuit which dispenses with the trigger windings on the saturable core inductors of the parallel conduction paths herein designated as P*a*′ and P*b*′. It is to be noted that this embodiment of the invention differs from that shown in Fig. 1 not only in the elimination of trigger windings but also by virtue of the elimination of the common coupling capacitor $C_3$ which connects the paths to the A. C. source. The R. F. choke 7, which serves as a D. C. return to ground, is also eliminated in this embodiment. The circuit of Fig. 4 has the saturable core inductors $L_1'$ and $L_2'$ of the paths P*a*′ and P*b*′ positioned side by side so as to make use of their mutual inductance. It is the mutual induction effect existing between the two saturable core inductors $L_1'$ and $L_2'$ that replaces the capacitor $C_3$ in the circuit of Fig. 1 inasmuch as it is this arrangement which ensures that either one of the paths P*a*′ or P*b*′, but not both of them, achieves a relatively high conduction status at a given time.

If it is assumed that the same amount of current flows through both paths P*a*′ and P*b*′, the current in the paths will be in phase and consequently the mutual coupling of the inductors will be negligible since the flux will be opposing. Further, if the effective inductances of the paths both tend to have the same value, the overall impedance of each path will be such that neither can operate in a resonant condition. This is an unstable operation and, as a result, whenever it exists, one of the paths is forced to go into resonance. Assume path P*a'* heads toward resonance. When this happens the mutual coupling between the paths will become positive since current in one is capacitive and the other inductive. Now the flux lines of both paths are aiding, tending to add a positive mutual inductance to both paths. However, path P*a'*, the path which is headed toward resonance, has had its inductance so greatly reduced by current saturation that the added effect of the positive mutual induction is not sufficient to bring it out of resonance. As a result, path P*a'* swings into a resonant state while path P*b'* swings into a non-resonant operating state.

Figure 5:
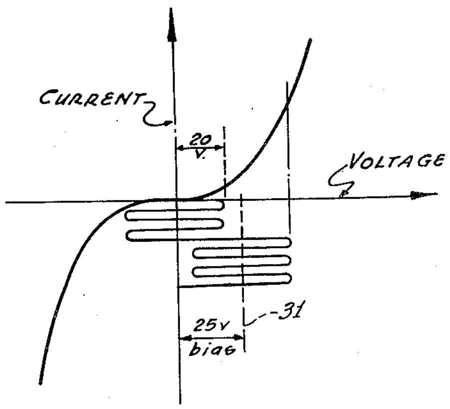
Fig. 5 is a graph illustrating the operating characteristics of a symmetrical non-linear resistor as utilized in the trigger circuit of Fig. 4.

The single trigger pulse to trigger input lead 25 of the flip-flop circuit of Fig. 4 is connected via symmetrical non-linear resistors 26 and 27 to intermediate points 28 and 29, respectively, of the paths. These matched symmetrical non-linear resistors 26 and 27 function essentially as dampers; i. e., they pass current only when a sufficient amount of voltage is applied across them. This is shown by Fig. 5 which is a graph illustrative of current variation in a symmetrical non-linear resistor as a function of applied voltage thereto. For purposes of illustration, assume that path P*a'* of Fig. 4 is in a relatively high conducting state. Under these conditions, a relatively large A. C. potential swing (20 volts, for example) is sensed at point 28 of path P*a'*, while point 29 of path P*b'* has a small A. C. potential swing. Consider now the effect of a trigger pulse of, say, 25 volt amplitude, applied to the lead input 25, as indicated by reference line 31 in Fig. 5. This trigger pulse is applied simultaneously to both of the matched non-linear resistors 26 and 27. The effect of the D. C. trigger pulse on the non-linear resistors 26 and 27 is to bias the A. C. voltage applied across them. The non-linear resistor 27 connected to the non-resonant path P*b'* is impressed with a relatively low A. C. voltage and thus, although biased by the trigger pulse, a negligible amount of current is passed therethrough; but the non-linear resistor 26 is impressed with a relatively high A. C. voltage such that the bias of the trigger pulse causes an appreciable amount of current to flow therethrough, thus effectively damping path P*a'* from a resonant to a non-resonant state. Thus, as a result of the applied trigger pulse, both paths are momentarily placed in a non-resonant state. Upon removal of the trigger pulse, the inductors 19*a'* and 19*b'* in the outputs of the paths cause path P*b'* to be favored into going into the highly conducting status, as was explained previously in conjunction with Fig. 1. Inasmuch as the bistable state circuit is essentially symmetrical, the opposite path is again made highly conductive upon application of the next trigger pulse to lead 25.

Figure 6:
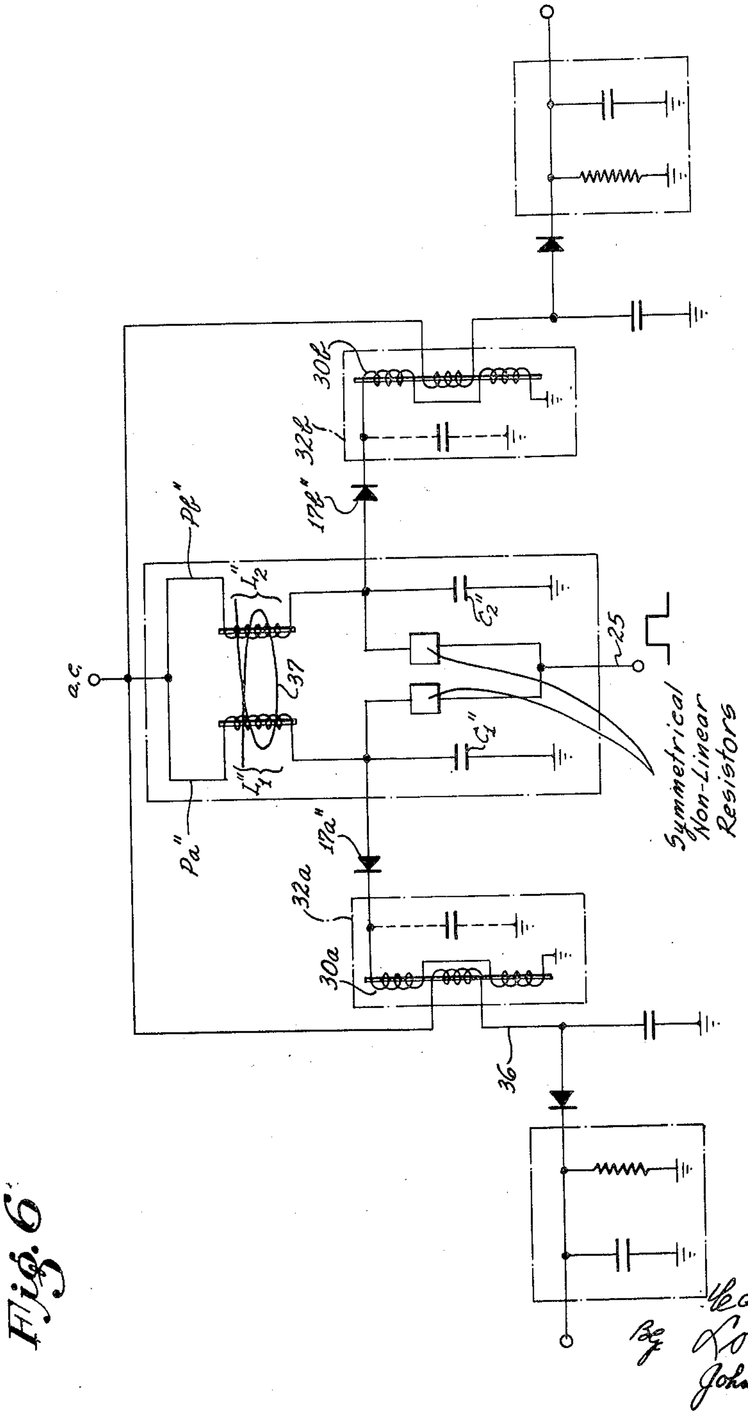
Fig. 6 is a schematic diagram of a preferred embodiment of the invention in which the inductive memories constitute the control windings of magnetic amplifiers coupled to the outputs of the flip-flop circuit.

In Fig. 6 there is presented a schematic diagram of a preferred embodiment of the invention in which the inductive memories utilized therein are the control windings of magnetic amplifiers coupled to the outputs of each of the paths herein designated as P*a''* and P*b''*. It is to be noted that the circuit is essentially identical to that shown in Fig. 4 with the exceptions that output inductors 19*a'* and 19*b'* therein have been replaced here by control windings 30*a* and 30*b* of magnetic amplifiers 32*a* and 32*b*, respectively. In addition, this embodiment uses an additional winding 37 to enhance the mutual inductive effect between inductors $L_1''$ and $L_2''$ in paths P*a''* and P*b''*, respectively. The power amplified signal, as obtained on output lead 36 from the magnetic amplifier 32*a*, is rectified and filtered by suitable circuitry such as previously shown in Fig. 1 so as to obtain a low impedance D. C. output signal.

It has thus been shown how the inductive memory type ferro-resonant bistable state circuit, as set forth in this application, is particularly applicable to a system in which a magnetic amplifier is to be utilized. The flip-flop circuit is used for controlling the magnetic amplifier which, in turn, delivers the required output power, thus dispensing with the necessity of loading the flip-flop.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proposition, and arrangement of parts without departing from the principle involved or sacrificing any of its advantages, and the invention is therefore claimed in embodiments of various forms all coming within the scope of the claims which follow.

What is claimed is:

1. In a flip-flop circuit: an alternating voltage input circuit having an impedance; a pair of non-linear paths arranged to be shunt connected to each other and to said input circuit such that one said path is retained in a resonant and the other in a non-resonant state; a single input trigger means coupled to both said paths; and an output circuit associated with each said paths including an inductive load for enabling said paths to reverse their operating states in response to signals received on said single input trigger means.

2. In combination: a pair of ferro-resonant branches; an alternating electromotive force connected across said branches such that only one of said branches is capable of being in a high conducting state at a time; an inductive load connected to each of said branches; and a single input trigger means associated with both said branches, whereby said inductive loads enable alternate branches to become highly conducting on appllication of successive pulses to said trigger means.

3. A flip-flop circuit including: a pair of paths, each comprising a ferro-resonant circuit arrangement; an alternating voltage input circuit connecting said paths in parallel and having such a value that one path is in a resonant and the other is in a non-resonant conducting status; means for supplying voltage impulses simultaneously to said paths; and an output circuit including an inductive load connected to each said path, whereby said inductive loads serve to induce voltages to damp the path having a high conducting status when the current through the paths is interrupted by a voltage impulse, thus effecting an alternate conduction status of said paths.

4. A flip-flop circuit comprising: a pair of reactive circuits connected in parallel, each said reactive circuits having a capacitor in series with an inductor, each said inductor having a core of magnetic material; a common impedance means connecting said parallel reactive circuits to a source of alternating current capable of retaining one of said reactive circuits in a resonant and the other in a non-resonant state; an output circuit connected to each of said reactive circuits, each said output circuit including a load inductor therein; and a trigger input coupled to simultaneously energize both the series inductors of said reactive circuits, whereby the load inductors in the outputs of said reactive circuits enable opposite paths to become highly conducting on application of successive pulses to said trigger input.

5. A flip-flop circuit comprising: a pair of paths, each comprising a ferro-resonant circuit arrangement; an alternating voltage input circuit connecting said paths in parallel and having such a value that one path is operated in a resonant and the other in a non-resonant conducting status; a source of trigger signals; a single input coupled to both said paths and operable when energized by said trigger signals to change the current flow through both said paths; and output circuits connected to each of said paths including a rectifier and an inductor, whereby the damping effect caused by the induced voltage in the inductor connected to the highly conducting path ensures that the opposite path will become resonant upon termination of said trigger signals.

6. A flip-flop circuit comprising: a pair of paths, each comprising a ferro-resonant circuit arrangement; an alternate voltage input circuit connecting said paths in parallel and having such a value that one path is in a resonant conducting status and the other is in a non-resonant conducting status; a source of trigger signals; a single input coupled to both said paths and operable when energized by trigger signals from said source to momentarily cause both said paths to be in a non-resonant conducting status; and means associated with said paths for storing energy dependent on the previous conducting status thereof, said latter means enabling alternate paths to be in a resonant conducting status upon termination of said trigger signals on said single input.

7. A flip-flop circuit including: a pair of ferro-resonant paths; an alternating electromotive force connected across said paths so that only one of said paths is capable of being in a relatively high conducting state at a time; an output circuit connected to each of said paths; a rectifier and an inductor included in each said output circuits; and a source of trigger signals connected to both said paths, the width of said trigger signals being of lesser magnitude than the time constant of said output circuits, whereby said load inductors enable alternate paths to become highly conducting on application of successive trigger signals to said paths.

8. In combination: a pair of ferro-resonant paths; an alternating electromotive force connected across said ferro-resonant paths so that only one is capable of attaining a relatively high conducting state at a time; an output circuit connected to each of said paths; a rectifier and a control winding of a magnetic amplifier connected in series in each of said output circuits; and a source of trigger signals connected to both said paths, whereby said output circuits enable alternate paths to become highly conducting on application of successive trigger signals to said paths.

9. In a flip-flop circuit: a pair of ferro-resonant paths; an alternating electromotive force connected across said ferro-resonant paths such that only one of said paths is capable of being in a relatively high conducting state at a given time; a source of trigger signals connected to both said paths, said trigger signals operable to change the current in said paths; and a filter circuit including a rectifier and a load inductor connected to each of said paths, whereby the induced voltages of said load inductors as a result of changes in currents in said paths enable alternate paths to become relatively highly conducting.

10. In a flip-flop circuit: a pair of ferro-resonant paths; an alternating voltage connected across said paths so that either but not both of said paths can attain a relatively highly conducting state at a time; a non-linear resistor connecting each said paths to a trigger pulse source; and an output circuit including a rectifier and a load inductor series connected to each said paths, whereby the self-induction of said load inductors enable alternate paths to become relatively high conducting on application of successive trigger pulses to said non-linear resistors.

11. A flip-flop circuit comprising: a pair of ferro-resonant paths, each of said paths including saturable core inductors so arranged that a mutual induction effect exists therebetween; an alternating electromotive force connected across said paths having such a value that said mutual induction effect ensures that only one said path goes into a relatively highly conducting state at a time; an output circuit connected to each of said paths; a rectifier and an inductor connected in series in each said output circuit; and a trigger input connected to both said paths, whereby said load inductors enable alternate paths to become highly conducting on application of successive signals to said trigger input.

12. A flip-flop circuit comprising: a pair of paths each including a ferro-resonant circuit arrangement; an alternating voltage input circuit connecting said paths in parallel and having such a value that one path is in a high current conducting status and the other is in a low current conducting status; a pair of non-linear resistors connecting a source of trigger pulses to said paths, said trigger pulses biasing the voltage across said resistors such that the high conducting path is effectively damped; and an output circuit including a unidirectional conducting means and an inductor connected to each said path, said inductors operable during the triggering action to momentarily maintain a D. C. current flow in said output circuits dependent upon the initial conducting status of said paths, whereby upon termination of said trigger pulse the path that previously had a low current conducting status swings to a high conducting status.

13. A bistable state circuit which comprises a pair of branch circuits each including a capacitor in series with an inductor having a magnetic core, the inductors of said branch circuits being inductively coupled together; a source of alternating current whose frequency and voltage are such that because of said inductive coupling said branch circuits are capable of operating in the region of their bistable ferro-resonant condition with one branch in a resonant and the other in a non-resonant condition; an output circuit for each said branches; and trigger means including an inductive load in said output circuits for enabling opposite branches to be successively triggered into a resonant condition.

References Cited in the file of this patent

UNITED STATES PATENTS 2,653,254 Spitzer ---------------- Sept. 22, 1953
2,682,615 Sziklai ---------------- June 29, 1954